(12) United States Patent
Sasaki et al.

(10) Patent No.: US 10,647,253 B2
(45) Date of Patent: May 12, 2020

(54) INFORMATION PROCESSING DEVICE, METHOD OF CONTROLLING TERMINAL DEVICE, AND NON-TRANSITORY COMPUTER-READABLE RECORDING MEDIUM

(71) Applicant: TOYOTA JIDOSHA KABUSHIKI KAISHA, Toyota-shi, Aichi-ken (JP)

(72) Inventors: Akira Sasaki, Miyoshi (JP); Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/292,251

(22) Filed: Mar. 4, 2019

(65) Prior Publication Data
US 2019/0283668 A1  Sep. 19, 2019

(30) Foreign Application Priority Data
Mar. 19, 2018 (JP) .................. 2018-050781

(51) Int. Cl.
*B60Q 1/50* (2006.01)
*B60Q 9/00* (2006.01)

(52) U.S. Cl.
CPC .................... *B60Q 9/00* (2013.01)

(58) Field of Classification Search
CPC ...................................... B60Q 9/00
USPC ..... 340/425.5, 539.1, 438, 467–470; 701/29, 701/31.4
See application file for complete search history.

(56) References Cited

U.S. PATENT DOCUMENTS

| | | | | |
|---|---|---|---|---|
| 6,263,333 | B1* | 7/2001 | Houchin | G06F 17/27 |
| 9,731,652 | B2* | 8/2017 | Mori | B60R 25/00 |
| 2005/0184862 | A1 | 8/2005 | Nagata | |
| 2011/0074565 | A1* | 3/2011 | Cuddihy | B60N 2/002 |
| | | | | 340/457 |
| 2012/0050021 | A1* | 3/2012 | Rao | B60N 2/002 |
| | | | | 340/425.5 |
| 2015/0048927 | A1* | 2/2015 | Simmons | G07C 9/00309 |
| | | | | 340/5.61 |

(Continued)

FOREIGN PATENT DOCUMENTS

| | | |
|---|---|---|
| JP | 2005-240349 A | 9/2005 |
| JP | 2010-159615 A | 7/2010 |
| JP | 2014-125779 A | 7/2014 |

*Primary Examiner* — Tai T Nguyen
(74) *Attorney, Agent, or Firm* — Oliff PLC

(57) ABSTRACT

An information processing device includes a first communication unit configured to communicate with a first terminal device, a second communication unit configured to communicate with a second terminal device, and a controller configured to generate an abnormality detection signal when an abnormality is detected based on vehicle information on a vehicle, and determine a position of a user based on a communication state of the first terminal device and the second terminal device possessed by the user. The controller is configured to cause the first communication unit to transmit the abnormality detection signal to the first terminal device when the controller determines that the position of the user is included in a first region, and cause the second communication unit to transmit the abnormality detection signal to the second terminal device when the controller determines that the position of the user is included in a second region.

8 Claims, 11 Drawing Sheets

(56) References Cited

U.S. PATENT DOCUMENTS

2017/0282791 A1* 10/2017 Voorhies .................. B60N 2/90

* cited by examiner

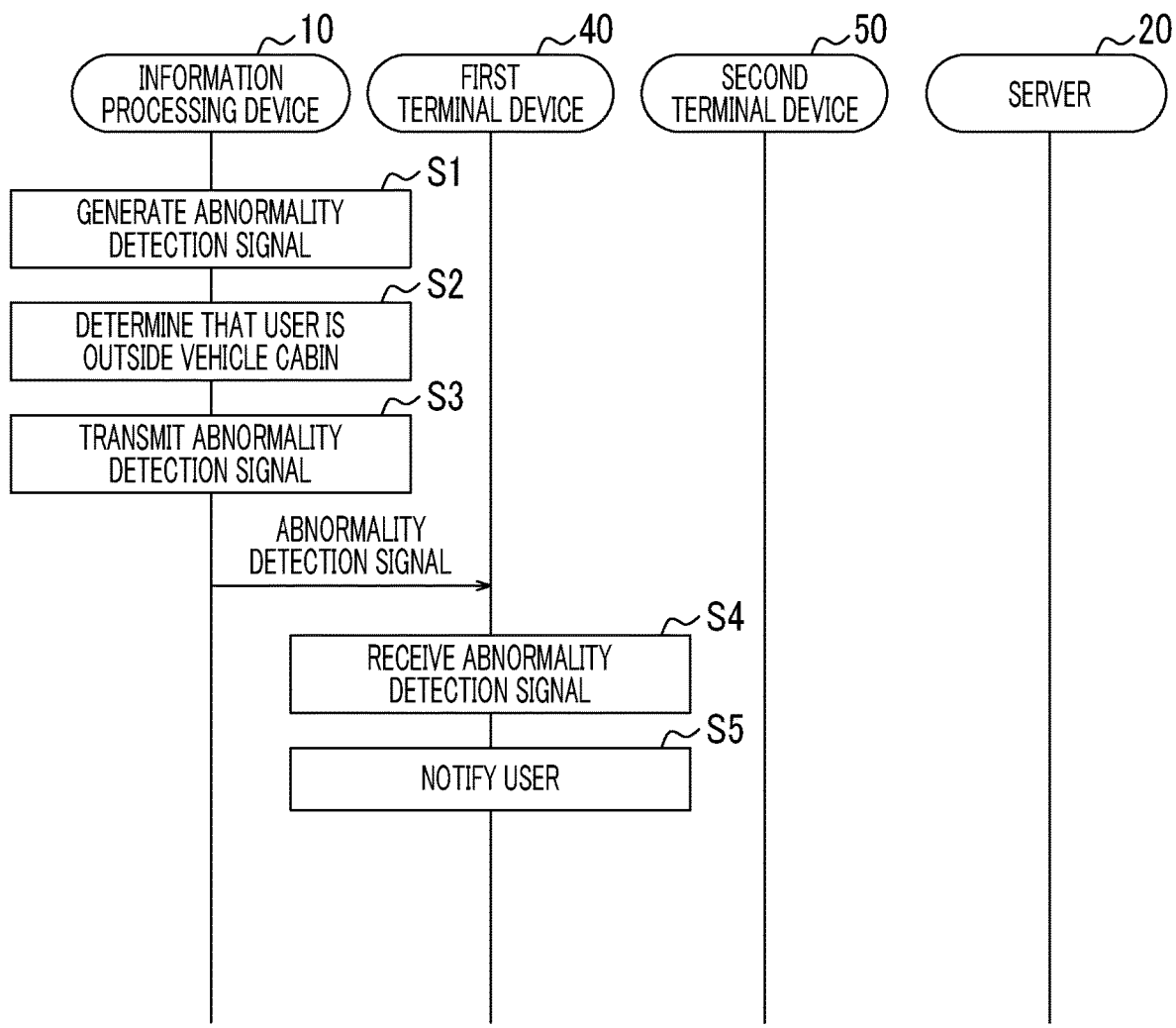

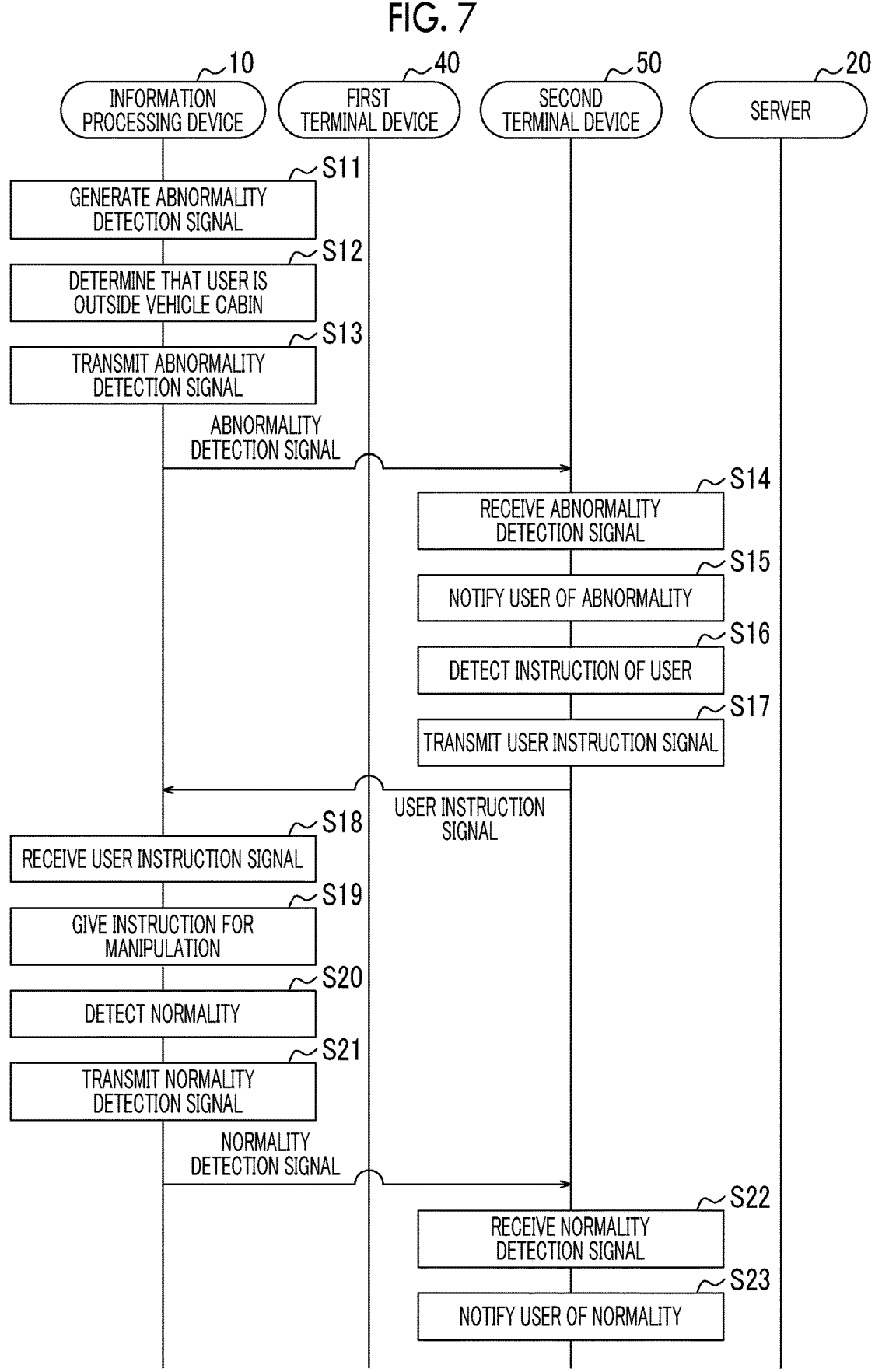

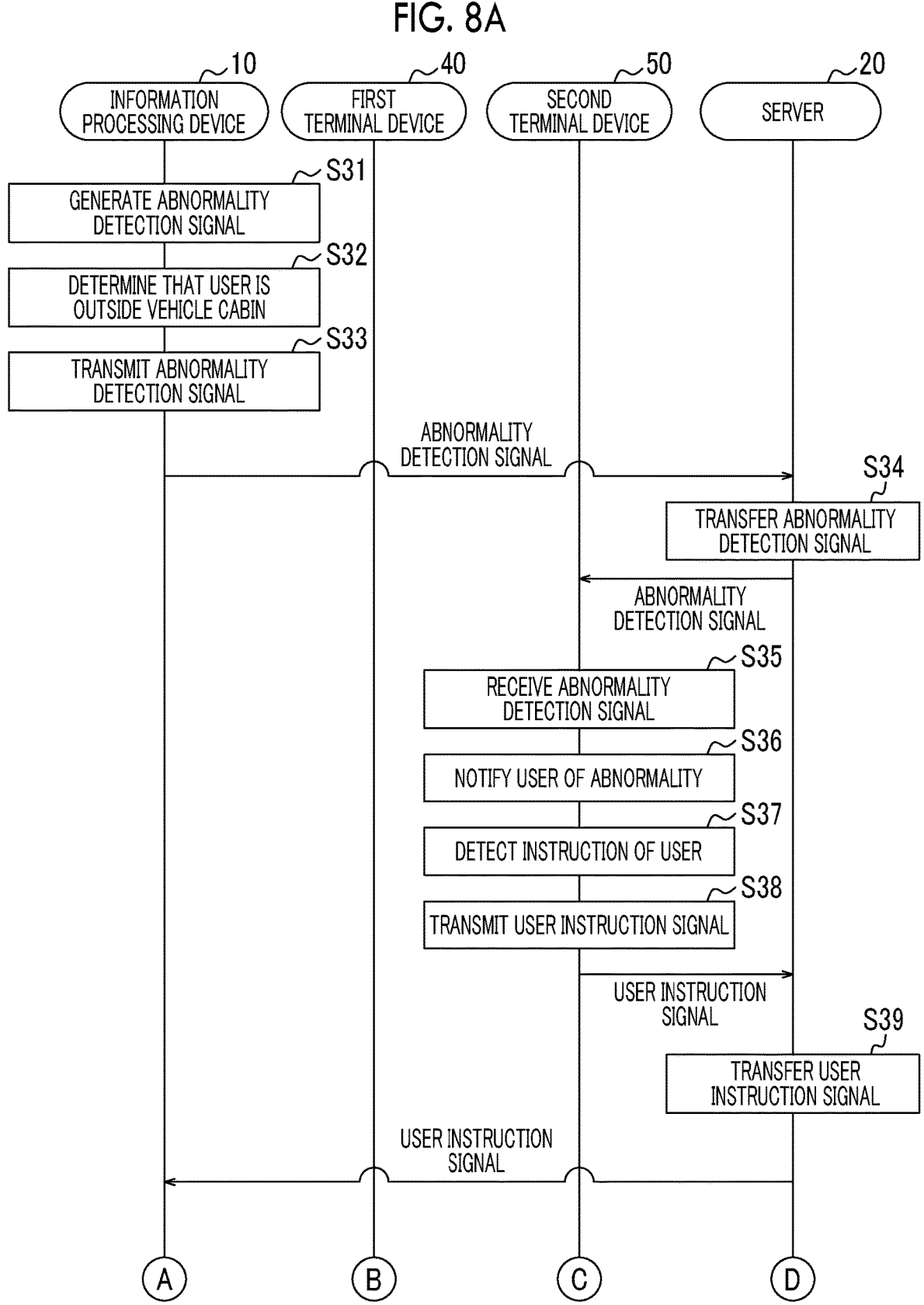

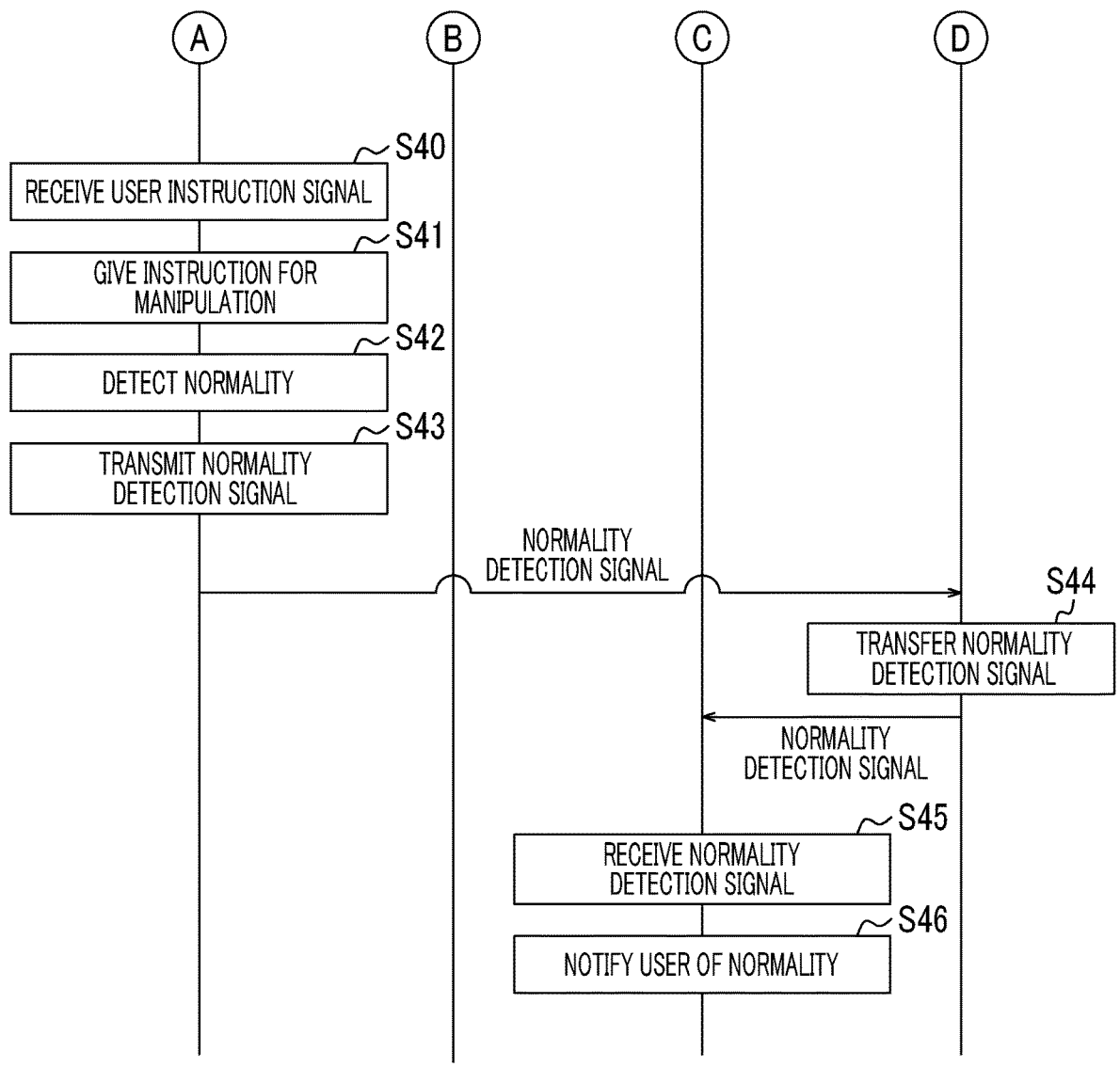

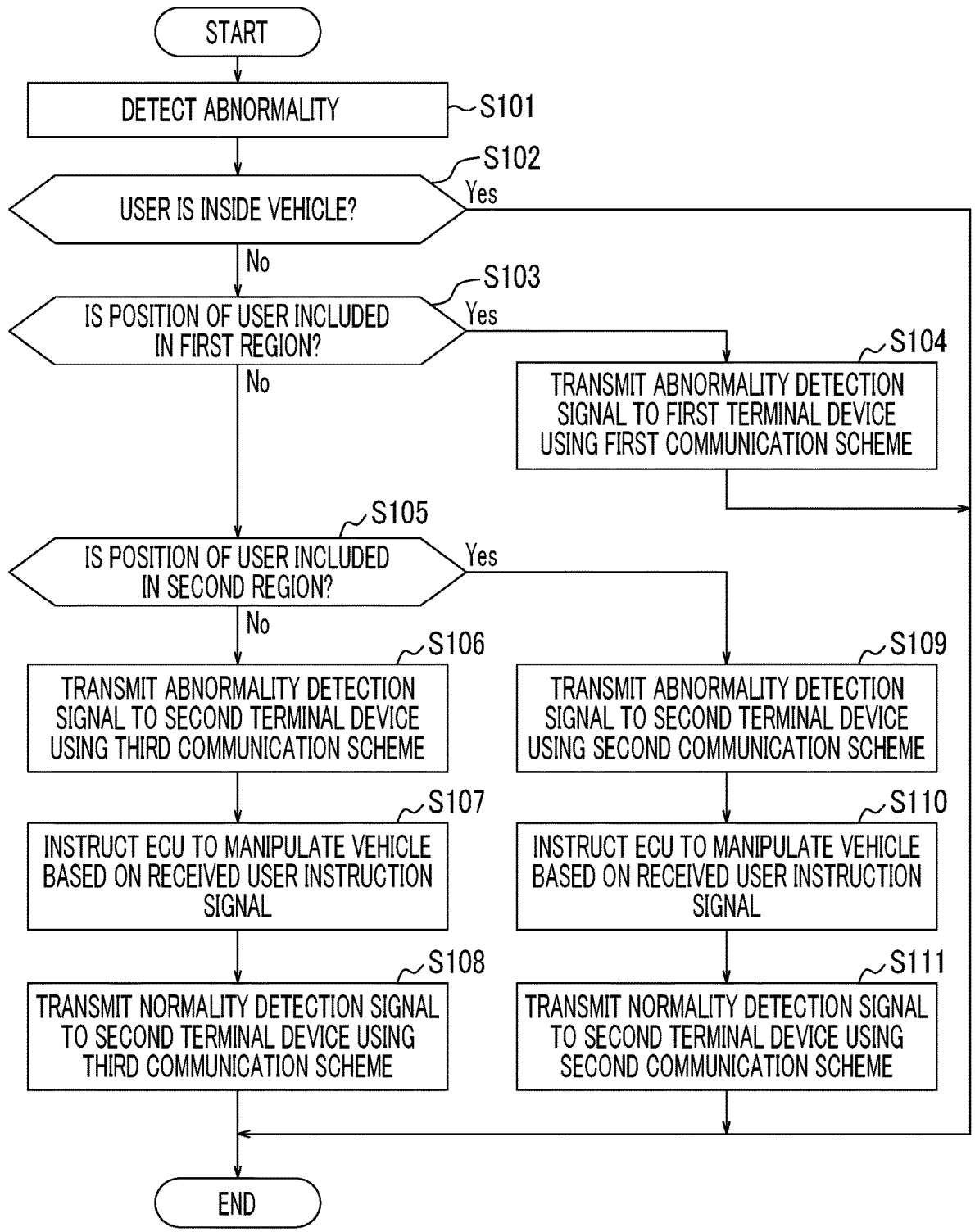

INFORMATION PROCESSING DEVICE, METHOD OF CONTROLLING TERMINAL DEVICE, AND NON-TRANSITORY COMPUTER-READABLE RECORDING MEDIUM

INCORPORATION BY REFERENCE

The disclosure of Japanese Patent Application No. 2018-050781 filed on Mar. 19, 2018 including the specification, drawings and abstract is incorporated herein by reference in its entirety.

BACKGROUND

1. Technical Field

The present disclosure relates to an information processing device, a method of controlling a terminal device, and a non-transitory computer-readable recording medium storing a program.

2. Description of Related Art

In the related art, a system that warns a user who forgets a manipulation such as locking of a vehicle door and gets off and enables a remote manipulation or the like to be executed is known. For example, a vehicle door control system described in Japanese Unexamined Patent Application Publication No. 2014-125779 (JP 2014-125779 A) includes an electronic key that transmits radio waves for locking or unlocking a vehicle door, and an in-vehicle device that performs a process of locking or unlocking the vehicle door according to reception of the radio waves transmitted from the electronic key.

SUMMARY

Here, in the vehicle door control system described in JP 2014-125779 A, key information from the in-vehicle device can be received by a smartphone. However, the key information to the smartphone is sent via the electronic key. Therefore, when a user possesses an electronic key and a smartphone, the user is annoyed since there is a notification to both (double notification). In addition, Japanese Unexamined Patent Application Publication No. 2010-159615 (JP 2010-159615 A) discloses a system that determines whether or not a user temporarily gets off and improves accuracy of warning. However, in a technology disclosed in JP 2010-159615 A, a warning is transmitted to an electronic key. Therefore, when the user is far away from the vehicle, communication with the electronic key cannot be performed and the user cannot receive the warning. Further, in Japanese Unexamined Patent Application Publication No. 2005-240349 (JP 2005-240349 A), a user who has forgotten a manipulation of a vehicle is warned via a center device provided at a service center or the like. However, since the warning is always via the center device, a notification time is needed even when the user is near the vehicle.

The present disclosure provides an information processing device capable of alleviating annoyance of a double notification and appropriately warning a user, a method of controlling a terminal device, and a non-transitory computer-readable recording medium storing a program.

A first aspect of the present disclosure relates to an information processing device that notifies a user of a vehicle of an abnormality in a state of the vehicle. The information processing device includes a first communication unit configured to communicate with a first terminal device using a first communication scheme; a second communication unit configured to communicate with a second terminal device using a second communication scheme; and a controller. The controller is configured to generate an abnormality detection signal when an abnormality is detected based on vehicle information on the vehicle, and determine a position of the user based on a communication state of the first terminal device and the second terminal device possessed by the user. The controller is configured to cause the first communication unit to transmit the abnormality detection signal to the first terminal device when the controller determines that the position of the user is included in a first region, and cause the second communication unit to transmit the abnormality detection signal to the second terminal device when the controller determines that the position of the user is included in a second region that is farther from the vehicle than the first region.

The information processing device according to the first aspect of the present disclosure may further include a third communication unit configured to communicate with the second terminal device using a third communication scheme. The controller may be configured to cause the third communication unit to transmit the abnormality detection signal to the second terminal device when the controller determines that the position of the user is included in neither the first region nor the second region.

In the information processing device according to the first aspect, the controller may be configured to give instruction for a manipulation of the vehicle based on a user instruction signal indicating content of an instruction of the user when the controller acquires the user instruction signal from the second terminal device.

In the information processing device according to the above aspect, the controller may be configured to acquire the user instruction signal that is continuously transmitted while the user is executing a predetermined manipulation with respect to the second terminal device and stop giving instruction for the manipulation of the vehicle when the controller does not acquire the user instruction signal.

In the information processing device according to the first aspect, the vehicle information may be information on opening or closing of a door of the vehicle, and the controller may be configured to generate the abnormality detection signal when an abnormality that a door of a driver seat of the vehicle is not locked is detected.

A second aspect of the present disclosure relates to a method of controlling a terminal device including a communication unit, a display unit, and an input unit. The communication unit is configured to communicate with an information processing device that notifies a user of a vehicle of an abnormality in a state of the vehicle using an abnormality detection signal. The method includes receiving, by the communication unit, the abnormality detection signal when the information processing device determines that a position of the user is included in a second region that is farther from the vehicle than a first region based on a communication state of the terminal device possessed by the user; displaying, by the display unit, content of the abnormality based on the abnormality detection signal; detecting, by the input unit, an instruction of the user for the abnormality; and transmitting, by the communication unit, a user instruction signal indicating content of the instruction of the user to the information processing device.

A third aspect of the present disclosure relates to a non-transitory computer-readable recording medium storing a program causing a terminal device including a communication unit, a display unit, and an input unit to execute a process. The communication unit is configured to communicate with an information processing device that notifies a user of a vehicle of an abnormality in a state of the vehicle using an abnormality detection signal. The process includes receiving, by the communication unit, the abnormality detection signal when the information processing device determines that a position of the user is included in a second region that is farther from the vehicle than a first region based on a communication state of the terminal device possessed by the user; displaying, by the display unit, content of the abnormality based on the abnormality detection signal; detecting, by the input unit, an instruction of the user for the abnormality; and transmitting, by the communication unit, a user instruction signal indicating content of the instruction of the user to the information processing device.

A fourth aspect of the present disclosure relates to an information processing device that notifies a user of a vehicle of an abnormality in a state of the vehicle. The information processing device includes a first communication unit configured to communicate with a first terminal device using a first communication scheme; a second communication unit configured to communicate with a second terminal device using a second communication scheme; and a controller. The controller is configured to generate an abnormality detection signal when an abnormality is detected based on vehicle information on the vehicle, and determine a position of the user based on a communication state of the first terminal device and the second terminal device possessed by the user. The controller is configured to cause the first communication unit to transmit the abnormality detection signal to the first terminal device when the controller determines that the position of the user is included in a first region and the abnormality is predetermined content, and cause the second communication unit to transmit the abnormality detection signal to the second terminal device when the controller determines that the position of the user is included in the first region and the abnormality is not the predetermined content.

According to each aspect of the present disclosure, it is possible to alleviate annoyance of a double notification and to appropriately warn a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a sequence diagram illustrating a process when the user is in a first region;

FIG. 7 is a sequence diagram illustrating a process when the user is in a second region;

FIG. 8A is a sequence diagram illustrating a process when the user is outside the second region;

FIG. 8B is a sequence diagram illustrating a process when the user is outside the second region;

FIG. 9 is a flowchart showing an operation of the information processing device;

DETAILED DESCRIPTION OF EMBODIMENTS

Vehicle Manipulation Forgetting Notification System

Figure 1:
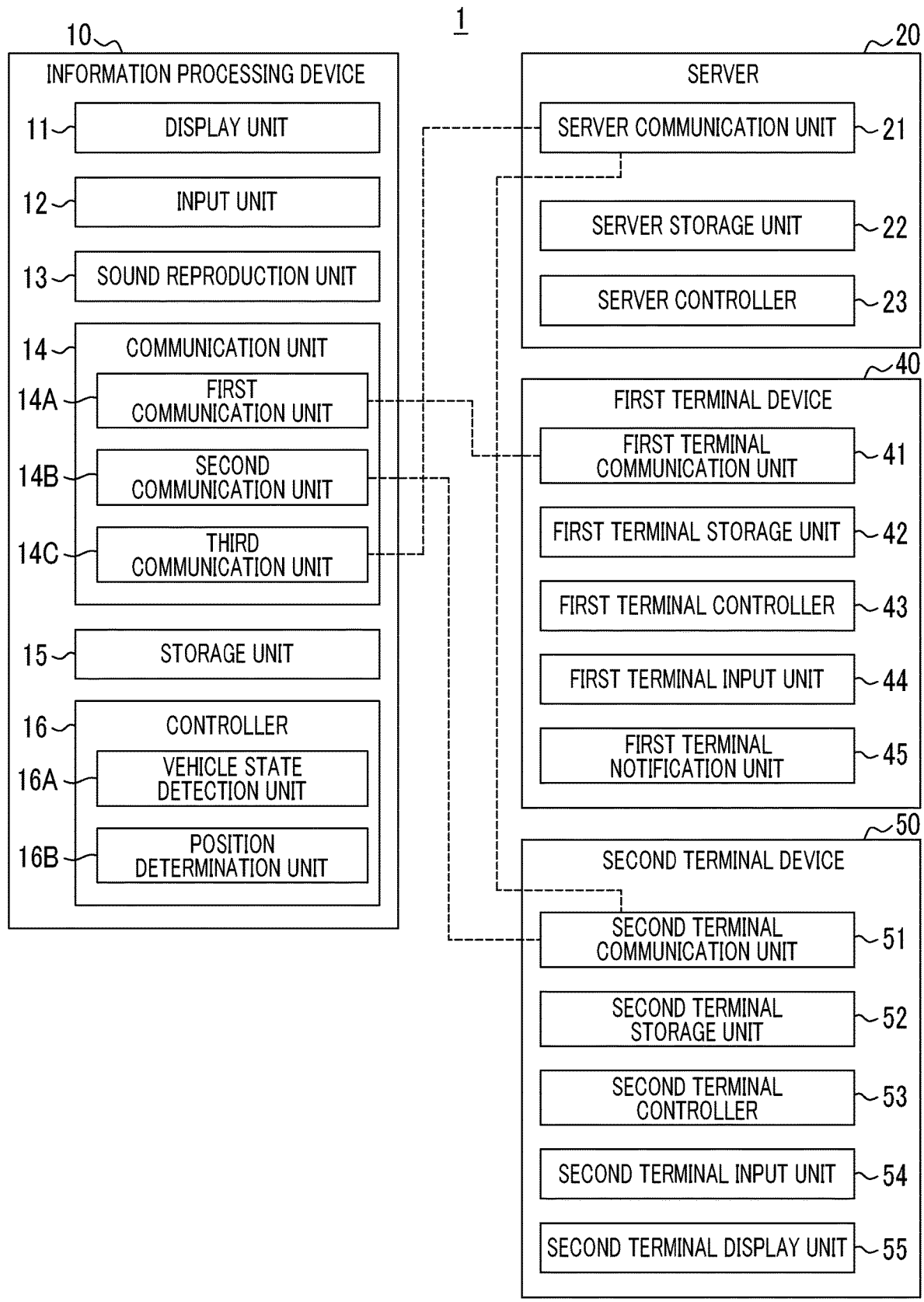
FIG. 1 is a diagram illustrating a schematic configuration of a vehicle manipulation forgetting notification system.

FIG. 1 is a diagram illustrating a schematic configuration of a vehicle manipulation forgetting notification system 1 including an information processing device according to an embodiment of the present disclosure. The vehicle manipulation forgetting notification system 1 includes an information processing device 10, a server 20, a first terminal device 40, and a second terminal device 50.

The information processing device 10 is, for example, an in-vehicle device mounted in a vehicle such as an automobile. The information processing device 10 is, for example, a navigation device. Here, the information processing device 10 may be a smartphone, a tablet terminal, or any other device that is used by a user. A configuration of the information processing device 10 will be described below.

The server 20 is, for example, a server device that performs a process regarding a vehicle. The server 20 is installed in a management center that collects and analyzes information on vehicles, for example. The information on the vehicle is, for example, position information of each of vehicles that are management targets. The server 20 may be configured of one or a plurality of server devices capable of communicating with each other. Further, the server 20 communicates with one or more information processing devices 10 mounted in one or more vehicles. A configuration of the server 20 will be described below.

The first terminal device 40 is, for example, a mobile terminal device possessed by the user of the vehicle. The first terminal device 40 is, for example, an electronic key. Here, the first terminal device 40 is not limited to the electronic key. The first terminal device 40 may be a mobile terminal device having a simpler configuration than the second terminal device 50 described below. The first terminal device 40 may be, particularly, a mobile terminal device that does not include a display. A configuration of the first terminal device 40 will be described below.

The second terminal device 50 is, for example, another mobile terminal device possessed by the user of the vehicle. The second terminal device 50 is, for example, a smartphone. Here, the second terminal device 50 is not limited to the smartphone. The second terminal device 50 may be, for example, a tablet terminal. A configuration of the second terminal device 50 will be described below.

Configuration of Information Processing Device

As illustrated in FIG. 1, an information processing device 10 includes a display unit 11, an input unit 12, a sound reproduction unit 13, a communication unit 14, a storage unit 15, and a controller 16.

The display unit 11 includes a display that displays information. The display may include, for example, a flat panel display such as a liquid crystal panel or an organic electro luminescence (EL) panel. In the embodiment, the information processing device 10 includes a touch panel display in which the display unit 11 and the input unit 12 are integrated.

The input unit 12 includes one or more input interfaces that receive an input from the user. The input unit 12 is, for example, a touch panel provided integrally with the display unit 11. Here, as another example, the input unit 12 may be a keyboard that receives a character input or a microphone that receives a voice input.

The sound reproduction unit 13 includes one or more speakers. The sound reproduction unit 13 may reproduce sound such as route guidance to the destination, for example.

The communication unit 14 includes one or more communication interfaces. The communication unit 14 may include a communication interface corresponding to a mobile communication standard such as 4G (4th Generation), a wired local area network (LAN) standard, a wireless LAN standard, or the like. In the embodiment, the communication unit 14 includes a first communication unit 14A, a second communication unit 14B, and a third communication unit 14C that use different communication schemes. Further, the communication unit 14 includes a communication interface of a controller area network (CAN). The communication unit 14 receives vehicle information from an electronic control unit (ECU) of the vehicle via the CAN. The communication unit 14 transmits an instruction of a manipulation of the vehicle, which will be described below, to the ECU via the CAN. The vehicle information includes information such as opening or closing of a door, opening or closing of a window or a roof, turning on and off of a light, a state of a driver seat, or a state of an engine.

The first communication unit 14A performs communication with the first terminal device 40 using a first communication scheme. The first communication scheme is one of short-distance wireless communications. In the embodiment, the first communication scheme is a communication using an ultra high frequency (UHF) signal (radio waves in a UHF band) suitable for communication with the first terminal device 40 at a position very close to the information processing device 10. The position very close to the information processing device 10 is, for example, within 2 m from the vehicle in which the information processing device 10 is mounted.

The second communication unit 14B communicates with the second terminal device 50 using a second communication scheme. The second communication scheme is one of a wireless local area network (LAN) and a wireless personal area network (PAN), and has a longer communication distance than the first communication scheme. In the embodiment, the second communication scheme is communication under a Bluetooth (registered trademark) Low Energy (BTLE) standard suitable for communication with the second terminal device 50 at a position closer to the information processing device 10. The position closer to the information processing device 10 is, for example, farther than 2 m from the vehicle in which the information processing device 10 is mounted and within 10 m.

The third communication unit 14C communicates with the second terminal device 50 using a third communication scheme. The third communication scheme is a communication scheme that enables communication over a longer distance than the second communication scheme. In the embodiment, the third communication unit 14C communicates with the second terminal device 50 via the server 20. Therefore, the third communication scheme uses a mobile communication standard such as 4Q which is suitable for communication with the server 20. Further, the third communication scheme includes communication via a network such as the Internet between a mobile communication base station and the server 20. The third communication unit 14C performs communication, for example, when the second terminal device 50 is at a position far from the information processing device 10. The position far from the information processing device 10 is, for example, a position farther than 10 m away from the vehicle in which the information processing device 10 is mounted.

The storage unit 15 includes one or more memories. In the embodiment, the memory may include, for example, a semiconductor memory, a magnetic memory, or an optical memory. Each memory included in the storage unit 15 may function as, for example, a main storage device, an auxiliary storage device, or a cache memory. The storage unit 15 stores any information that is used for an operation of the information processing device 10. The storage unit 15 may store identification (ID) profile data for specifying the second terminal device 50 that is a communication destination, which is used when communication with the second terminal device 50 is performed using the second communication scheme or the third communication scheme. Further, the storage unit 15 may store map information to be used in route guidance to be described below.

The controller 16 includes one or more processors. The processor may include, for example, a general-purpose processor, and a dedicated processor specialized to a specific process. For example, the controller 16 may be a central processing unit (CPU). The controller 16 controls an overall operation of the information processing device 10. In the embodiment, the controller 16 includes a vehicle state detection unit 16A and a position determination unit 16B.

When the vehicle state detection unit 16A detects an abnormality based on vehicle information, the vehicle state detection unit 16A generates an abnormality detection signal. The vehicle state detection unit 16A acquires vehicle information (for example, information on opening or closing of a door, opening or closing of a window or a roof, turning on or off of a light, a state of a driver seat, and a state of an engine) from the ECU of the vehicle via the communication unit 14. For example, when the driver seat is vacant, the vehicle state detection unit 16A can determine that a user (particularly, a driver) of the vehicle is outside a vehicle cabin. Further, for example, when the vehicle state detection unit 16A detects an abnormality that a door of the driver seat is not locked from information on opening or closing the door, the vehicle state detection unit 16A can generate an abnormality detection signal indicating that there is an abnormality in door lock. The abnormality detection signal includes at least information indicating the content of abnormality of the vehicle. The generated abnormality detection signal is transmitted to the first terminal device 40 or the second terminal device 50 as will be described below.

The position determination unit 16B determines the position of the user based on a communication state of the first communication unit 14A and the second communication unit 14B. In the embodiment, the communication state is determined based on the intensity of a received signal. In the embodiment, the first communication unit 14A performs communication using a UHF signal. The first communication unit 14A transmits a test signal for position confirmation to the first terminal device 40 possessed by the user. Further, in the embodiment, the second terminal device 50 performs communication according to a BTLE standard. The second terminal device 50 transmits a test signal for position confirmation to the second terminal device 50 possessed by the user according to the BTLE standard. The test signal is transmitted a plurality of times at predetermined intervals, for example. The first communication unit 14A and the second communication unit 14B receive the signals transmitted from the first terminal device 40 and the second terminal device 50 in response to the test signal. The position determination unit 16B acquires information on the intensity of the signal received by the first communication unit 14A and the second communication unit 14B. A well-known technique can be used as a method of estimating the position of the user from the intensity of the received signal. For example, when the intensity of the received signal of the first communication unit 14A is equal to or higher than a predetermined threshold value (for example, 20% of the maximum intensity), the position determination unit 16B determines that the user is in a region within a first distance (for example, 2 m) from the vehicle. Further, for example, when the intensity of the received signal of the first communication unit 14A is lower than the predetermined threshold value and the intensity of the received signal of the second communication unit 14B is higher than the predetermined threshold value, the position determination unit 16B may determine that the user is in a region farther than the first distance from the vehicle and within a second distance (for example, 10 m). Further, for example, when the intensity of the received signal of the second communication unit 14B is lower than the predetermined threshold value, the position determination unit 16B may determine that the user is in a region farther than the second distance from the vehicle.

Figure 2:
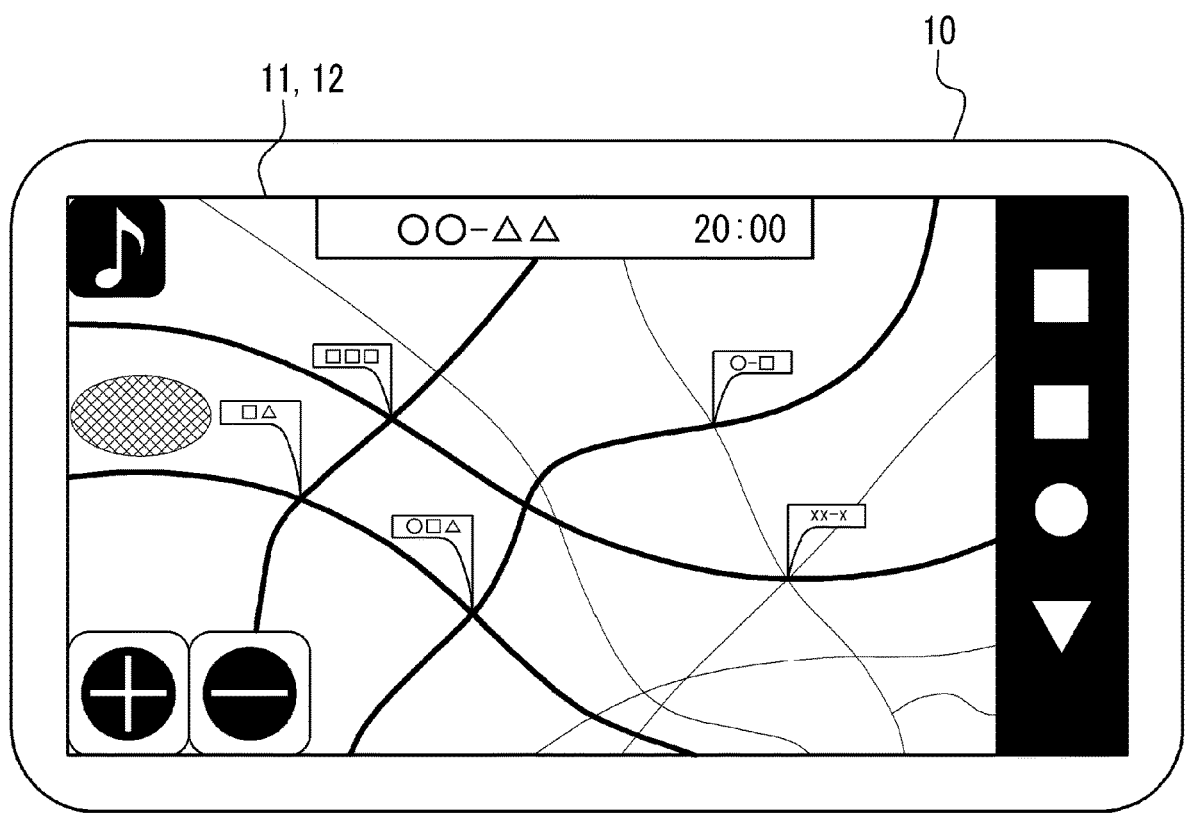
FIG. 2 is a diagram illustrating an example of an information processing device mounted in a vehicle.

As illustrated in FIG. 2, in the embodiment, the information processing device 10 is a navigation device. The information processing device 10 displays a map on the touch panel display (corresponding to the display unit 11 and the input unit 12) while the vehicle is moving. In addition, the information processing device 10 guides the route to the user by voice using the sound reproduction unit 13. When the user gets off the vehicle, the information processing device 10 notifies the user of the vehicle of the abnormality through the abnormality detection signal when the information processing device 10 detects the abnormality in the state of the vehicle based on the vehicle information.

Here, the controller 16 loads the program stored in the storage unit 15 and executes the program, such that functions such as the route guidance of the vehicle state detection unit 16A, the position determination unit 16B, and the vehicle can be realized.

Server Configuration

As illustrated in FIG. 1, the server 20 includes a server communication unit 21, a server storage unit 22, and a server controller 23.

The server communication unit 21 includes one or more communication interfaces. The server communication unit 21 may include a communication interface corresponding to a mobile communication standard such as 4G (4th Generation), a wired local area network (LAN) standard, a wireless LAN standard, or the like. In the embodiment, the server communication unit 21 can communicate with the third communication unit 14C of the information processing device 10. Further, the server communication unit 21 can communicate with the second terminal device 50. Communication between the third communication unit 14C of the information processing device 10 and the second terminal device 50 is performed via the server communication unit 21.

The server storage unit 22 includes one or more memories. Each memory included in the server storage unit 22 may function as, for example, a main storage device, an auxiliary storage device, or a cache memory. The server storage unit 22 stores any information that is used for an operation of the server 20. The server storage unit 22 may store ID profile data for specifying the second terminal device 50 that is a communication destination, which is used, for example, when the abnormality detection signal or the like from the information processing device 10 is transferred to the second terminal device 50. Here, the server storage unit 22 may store the profile data instead of the storage unit 15 of the information processing device 10. In this case, the information processing device 10 may start communication with the second terminal device 50 after acquiring the profile data from the server 20.

The server controller 23 includes one or more processors. The processor may include, for example, a general-purpose processor, and a dedicated processor specialized to a specific process. The server controller 23 controls an overall operation of the server 20.

Configuration of First Terminal Device

As illustrated in FIG. 1, the first terminal device 40 includes a first terminal communication unit 41, a first terminal storage unit 42, a first terminal controller 43, a first terminal input unit 44, and a first terminal notification unit 45.

The first terminal communication unit 41 includes one or more communication interfaces. The first terminal communication unit 41 may include a communication interface corresponding to a mobile communication standard such as 4G (4th Generation), a wired local area network (LAN) standard, a wireless LAN standard, or the like. In the embodiment, the first terminal communication unit 41 can directly communicate with the first communication unit 14A of the information processing device 10. That is, the first terminal communication unit 41 performs communication with the first communication unit 14A using the first communication scheme.

The first terminal storage unit 42 includes one or more memories. Each memory included in the first terminal storage unit 42 may function as, for example, a main storage device, an auxiliary storage device, or a cache memory. The first terminal storage unit 42 stores any information that is used for an operation of the first terminal device 40. The first terminal storage unit 42 may store ID profile data for specifying a vehicle of which the door is locked or unlocked by the first terminal device 40 which is an electronic key.

The first terminal controller 43 includes one or more processors. The processor may include, for example, a general-purpose processor, and a dedicated processor specific to a specific process. The first terminal controller 43 controls an overall operation of the first terminal device 40. In the embodiment, the first terminal controller 43 causes the first terminal communication unit 41 to transmit radio waves for locking or unlocking the door in response to an instruction from the user. The first terminal controller 43 can control various operations of the first terminal device 40 by loading a program stored in the first terminal storage unit 42 and executing the program.

The first terminal input unit 44 includes one or more input interfaces that receive an input from the user. In the embodiment, the first terminal input unit 44 is configured of buttons. As another example, the first terminal input unit 44 may be a pressure sensitive element or the like.

The first terminal notification unit 45 notifies the user that predetermined information has been received. In the embodiment, the predetermined information is an abnormality detection signal from the information processing device 10. Further, in the embodiment, the first terminal notification unit 45 notifies the user by vibration. For example, the first terminal notification unit 45 may include a motor that starts operation when the first terminal communication unit 41 has received the abnormality detection signal. As another example, the first terminal notification unit 45 may notify the user by sound. In this case, the first terminal notification unit 45 may be configured to include a speaker.

Figure 3:
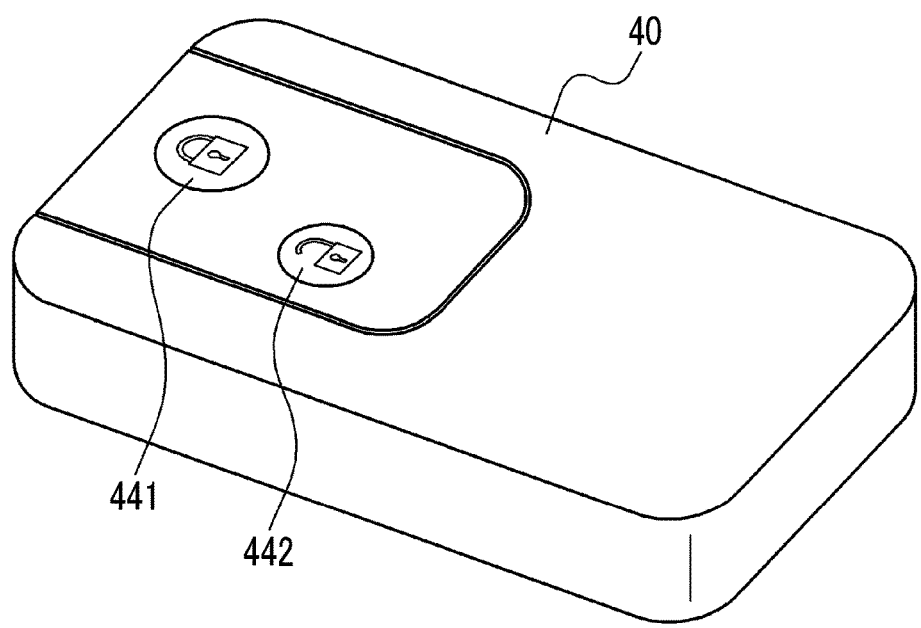
FIG. 3 is a diagram illustrating an example of a first terminal device possessed by a user.

As illustrated in FIG. 3, in the embodiment, the first terminal device 40 is an electronic key. In the example of FIG. 3, the first terminal device 40 includes a button 441 for locking the door of the vehicle and a button 442 for unlocking the door of the vehicle. When the user presses the button 441, the first terminal device 40 transmits radio waves for locking the door. When the user presses the button 442, the first terminal device 40 transmits radio waves for unlocking the door. For example, the ECU of the vehicle locks or unlocks the door when the ECU receives the radio waves for locking or unlocking the door.

Configuration of Second Terminal Device

As illustrated in FIG. 1, the second terminal device 50 includes a second terminal communication unit 51, a second terminal storage unit 52, a second terminal controller 53, a second terminal input unit 54, and a second terminal display unit 55.

The second terminal communication unit 51 includes one or more communication interfaces. The second terminal communication unit 51 may include a communication interface corresponding to a mobile communication standard such as 4G (4th Generation), a wired local area network (LAN) standard, a wireless LAN standard, or the like. In the embodiment, the second terminal communication unit 51 can directly communicate with the second communication unit 14B of the information processing device 10. That is, the second terminal communication unit 51 performs communication with the second communication unit 14B using the second communication scheme. In addition, the second terminal communication unit 51 communicates with the third communication unit 14C via the server 20. That is, the second terminal communication unit 51 also performs communication using the third communication scheme.

The second terminal storage unit 52 includes one or more memories. Each memory included in the second terminal storage unit 52 may function as, for example, a main storage device, an auxiliary storage device, or a cache memory. The second terminal storage unit 52 stores any information that is used for an operation of the second terminal device 50. The second terminal storage unit 52 may store ID profile data for specifying the information processing device 10 that is a communication destination.

The second terminal controller 53 includes one or more processors. The processor may include, for example, a general-purpose processor, and a dedicated processor specific to a specific process. The second terminal controller 53 controls an overall operation of the second terminal device 50. In the embodiment, the second terminal controller 53 causes the second terminal communication unit 51 to transmit the user instruction signal indicating the content of the instruction of the user. The user instruction signal is a signal indicating the content of the instruction of the user. The instruction of the users includes, for example, closing the window or roof of the vehicle, turning off the light, and locking the door. The second terminal controller 53 can control various operations of the second terminal device 50 by loading the program stored in the second terminal storage unit 52 and executing the program.

The second terminal input unit 54 includes one or more input interfaces that receive an input from the user. In the embodiment, the second terminal input unit 54 is a touch panel provided integrally with the second terminal display unit 55. Here, as another example, the second terminal input unit 54 may be a keyboard that receives a character input or a microphone that receives a voice input.

The second terminal display unit 55 includes a display that displays information. The display may include, for example, a flat panel display such as a liquid crystal panel or an organic electro luminescence (EL) panel. In the embodiment, the second terminal device 50 includes a touch panel display in which the second terminal display unit 55 and the second terminal input unit 54 are integrated.

Figure 4:
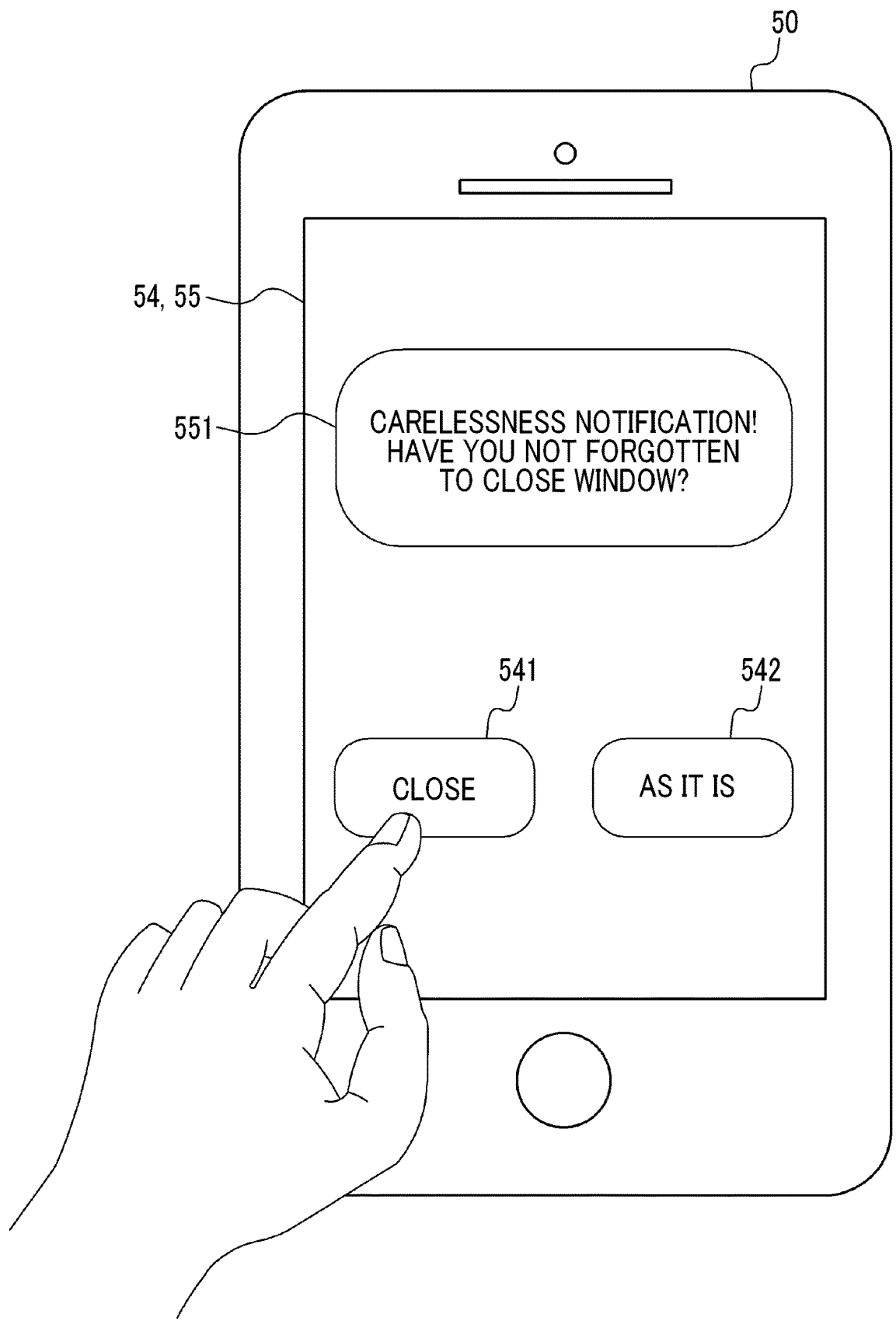
FIG. 4 is a diagram illustrating an example of a second terminal device possessed by the user.

As illustrated in FIG. 4, in the embodiment, the second terminal device 50 is a smartphone. In the example of FIG. 4, a message 551, a button 541, and a button 542 are displayed on a touch panel display in which the second terminal display unit 55 and the second terminal input unit 54 are integrated. The message 551 indicates content of abnormality of the vehicle based on the abnormality detection signal received by the second terminal device 50. In the example of FIG. 4, the message 551 warning that the user has forgotten about closing of the window and got off the vehicle is displayed. The button 541 and the button 542 are for the user to give an instruction for the abnormality of the vehicle. When the second terminal input unit 54 detects a touch on the button 541 written as "closed", the second terminal controller 53 causes the second terminal communication unit 51 to transmit a user instruction signal including the content of the instruction "close the window". Further, when the second terminal input unit 54 detects the touch of the button 542 written as "as it is", the second terminal controller 53 causes the second terminal communication unit 51 to transmit a user instruction signal including content of an instruction "keep the window as it is". Here, the display of the button 541 and the button 542 can change according to the abnormality of the vehicle. For example, when the abnormality is "not turn off light," the button 541 may change to a statement "turn off".

Here, the display of FIG. 4 may be a screen of an application for communication with the information processing device 10 installed in the second terminal device 50. For example, when the second terminal device 50 receives the abnormality detection signal, the second terminal device 50 may first display a pop-up screen on the touch panel display. When the second terminal device 50 detects that the user touches the pop-up screen, the second terminal device 50 may activate the application and perform a display as illustrated in FIG. 4. Further, the second terminal device 50 may change the content of the message 551 to "completed" or the like when the second terminal device 50 receives the normality detection signal from the information processing device 10 after the second terminal device 50 performs the display of FIG. 4. Here, the normality detection signal is generated when the manipulation (for example, closing a window) according to the instruction of the user is completed in the vehicle and the information processing device 10 detects normality (resolving of abnormality) based on the vehicle information.

Position Determination

Figure 5:
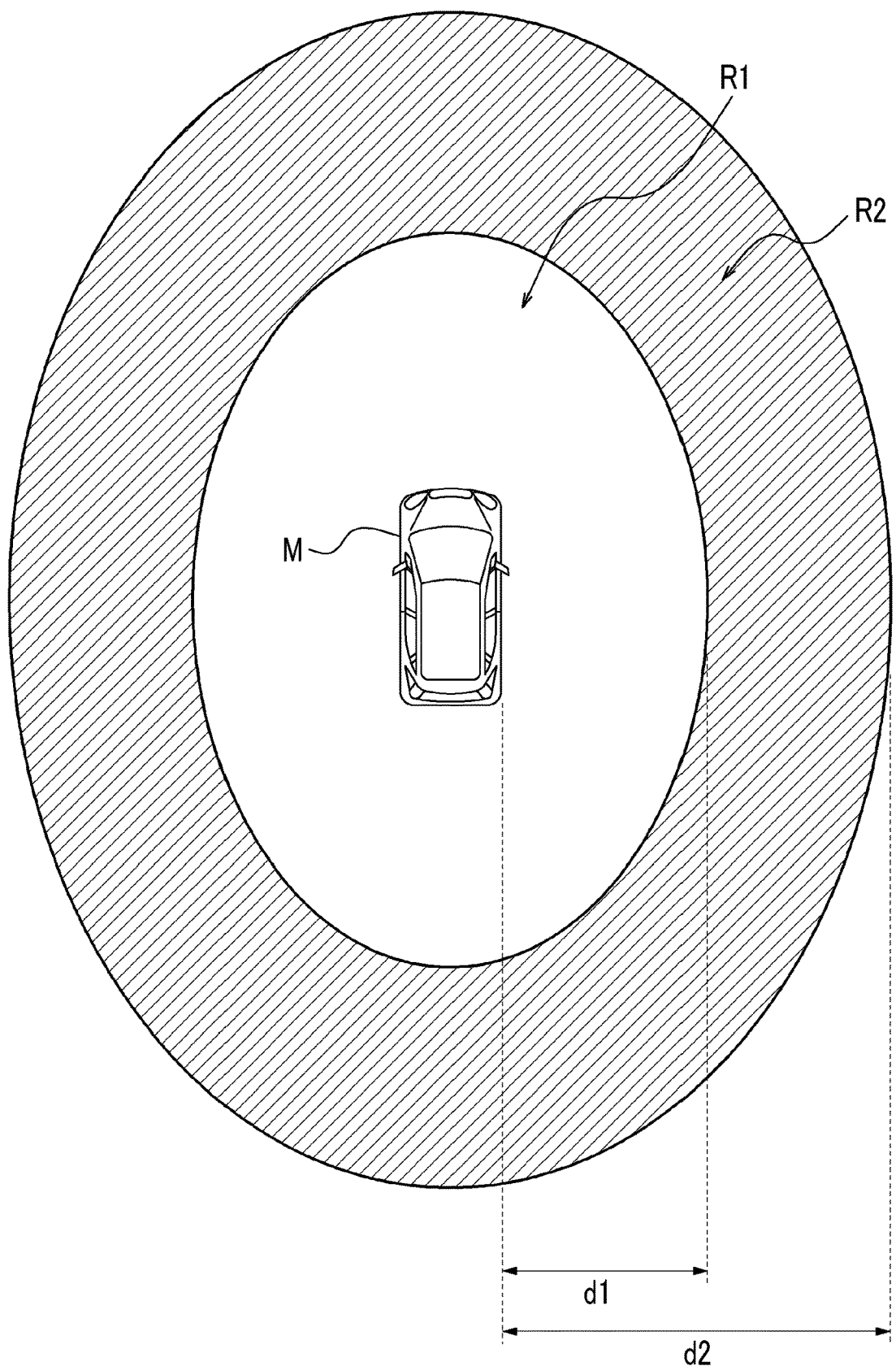
FIG. 5 is a diagram illustrating a determination of a position of the user.

FIG. 5 is a diagram illustrating a determination of the position of the user (hereinafter simply referred to as a "position determination"). FIG. 5 is a top view in which a vehicle M is at a center. As described above, the position determination unit 16B of the information processing device 10 determines the position of the user based on the communication state of the first communication unit 14A and the second communication unit 14B. In the embodiment, the position determination unit 16B determines whether the position of the user is the first region R1, the second region R2, or a region (hereinafter simply referred to as a "third region") farther than the second region R2. As illustrated in FIG. 5, the first region R1 in the embodiment is a region outside the vehicle M and within a first distance d1 from the vehicle M. In the embodiment, the first distance d1 is 2 m. Further, the second region R2 in the embodiment is a region outside the vehicle M and farther than the first distance d1 from the vehicle and within a second distance d2. In the embodiment, the second distance d2 is 10 m. Further, the third region in the embodiment is a region outside the vehicle M and farther than the second distance d2 from the vehicle (that is, 10 m).

The first region R1 is a region in which the first communication unit 14A and the first terminal device 40 can communicate using the first communication scheme. It is desirable for the first region R1 to be further set to be a region in which the user notified of the abnormality by the first terminal device 40 can immediately return to the vehicle M (for example, within 10 seconds). The user who is notified of the abnormality in the state of the vehicle in the first region R1 is expected to return to the vehicle M and resolve the abnormality. Therefore, for the user in the first region R1, the information processing device 10 transmits an abnormality detection signal to the first terminal device 40 that does not display the content of the abnormality. That is, when the position determination unit 16B determines that the position of the user is included in the first region R1, the controller 16 of the information processing device 10 transmits an abnormality detection signal to the first terminal device 40 using the first communication unit 14A.

The second region R2 is a region in which the second communication unit 14B and the second terminal device 50 can communicate using the second communication scheme. Further, the second region R2 is a region in which it is difficult for the first communication unit 14A and the first terminal device 40 to communicate using the first communication scheme. It is desirable for the second region R2 to be further set to be a region in which a remote manipulation can be performed while viewing the vehicle M. Specifically, the remote manipulation using the second terminal device 50 is a manipulation in which the user resolves the abnormality of the vehicle M by touching the button 541 or the like on the touch panel display. The remote manipulation is realized by the controller 16 of the information processing device 10 instructing an ECU or the like of the vehicle M to manipulate the vehicle (for example, close the window) based on the user instruction signal transmitted from the second terminal device 50. When the information processing device 10 determines that the position of the user is included in the second region R2, the information processing device 10 transmits the abnormality detection signal to the second terminal device 50 so that the user who is difficult to immediately return to the vehicle M can execute the remote manipulation.

The third region is a region in which the third communication unit 14C and the second terminal device 50 can communicate using the third communication scheme. Further, the third region is a region in which communication using the first communication scheme and the second communication scheme is difficult. For the user in the third region, the information processing device 10 transmits an abnormality detection signal to the second terminal device 50 capable of displaying the content of the abnormality using the third communication scheme. As described above, in the third communication scheme, communication is performed via the server 20. Therefore, although a communication speed decreases, it is possible to transmit the abnormality detection signal or the like to the second terminal device 50 of a user far away from the vehicle M.

Here, in the example of FIG. 5, the first region R1 and the second region R2 are elliptical in a top view, but the first region R1 and the second region R2 are not limited to this shape. For example, the first region R1 and the second region R2 may have a perfect circle shape. Further, for example, the first region R1 and the second region R2 may have the same shape (for example, a substantially rectangular shape) as that of the vehicle M.

Communication Process

FIG. 6 is a sequence diagram illustrating an example of a communication process in a case where the position determination unit 16B determines that the position of the user is included in the first region R1.

When the information processing device 10 detects an abnormality based on the vehicle information, the information processing device 10 generates an abnormality detection signal (step S1). The abnormality is, for example, that the door is not locked.

The information processing device 10 determines that the user of the vehicle is outside the vehicle cabin based on the information indicating that the driver seat is vacant, for example (step S2). Here, the information processing device 10 can determine that the driver seat is vacant based on the state of the driver seat which is one of pieces of vehicle information, as described above.

The information processing device 10 transmits an abnormality detection signal (step S3). In this case, the information processing device 10 transmits the abnormality detection signal to the first terminal device 40 using the first communication scheme.

The first terminal device 40 receives the abnormality detection signal (step S4). In the embodiment, the first terminal device 40 is an electronic key possessed by the user.

The first terminal device 40 notifies the user that the first terminal device 40 has received the abnormality detection signal (step S5). In the embodiment, the first terminal device 40, which is an electronic key, notifies the user through vibration.

In this case, since the user is in the first region R1, the user can immediately return to the vehicle. The user can deal with the abnormality to resolve the abnormality while confirming the abnormality occurring in the vehicle.

Here, when the abnormality is that the door is not locked, the user can deal with the abnormality without returning to the vehicle. The user can lock the door by pushing the button 441 of the first terminal device 40 which is an electronic key when the user is reminded that the door is not locked at the time of getting off by notification. Here, the abnormality of the vehicle that can be resolved at a distance place using the first terminal device 40 is limited to the predetermined content (in this example, the door is not locked). Here, the predetermined content is determined according to an instruction of the user that can be performed by the first terminal device 40. For example, when the first terminal device 40, which is an electronic key, also includes a switch that can remotely open or close the roof of the vehicle, the predetermined content may be that the door is not locked and the roof is open.

FIG. 7 is a sequence diagram illustrating an example of a communication process in a case where the position determination unit 16B determines that a position of the user is included in the second region R2.

When the information processing device 10 detects an abnormality, the information processing device 10 generates an abnormality detection signal (step S11). Further, the information processing device 10 determines that the user of the vehicle is outside the vehicle cabin (step S12). Steps S11 and S12 correspond to steps S1 and S2 in FIG. 6. Therefore, detailed description will be omitted.

The information processing device 10 transmits an abnormality detection signal (step S13). In this case, the information processing device 10 transmits the abnormality detection signal to the second terminal device 50 using the second communication scheme.

The second terminal device 50 receives the abnormality detection signal (step S14). In the embodiment, the second terminal device 50 is a smartphone possessed by the user.

The second terminal device 50 notifies the user of the abnormality based on the received abnormality detection signal (step S15). The abnormality notification to the user is executed, for example, by displaying the message 551 in FIG. 4.

The second terminal device 50 detects an instruction of the user (step S16). The detection of the instruction of the user is executed by detecting the touch of the user to the button 541 or the button 542 in FIG. 4, for example.

The second terminal device 50 transmits a user instruction signal indicating the content of the instruction of the user (step S17). In this case, the second terminal device 50 transmits the user instruction signal to the information processing device 10 using the second communication scheme. Content of the instruction of the user is, for example, an instruction to close the window.

The information processing device 10 receives the user instruction signal (step S18). The information processing device 10 gives instruction for a manipulation of the vehicle based on the user instruction signal (step S19). As described above, the information processing device 10 is, for example, an in-vehicle device such as a navigation device. The information processing device 10 transmits an instruction to manipulate the vehicle (for example, an instruction to close the window) to the ECU of the vehicle via the CAN. The information processing device 10 determines that a manipulation as instructed by the ECU has been executed, based on the vehicle information acquired after the instruction is transmitted.

The information processing device 10 performs normal detection based on the vehicle information, that is, detects that the abnormality has been resolved (step S20). The information processing device 10 generates a normality detection signal. The normality detection signal includes at least information indicating that the abnormality of the vehicle has been resolved.

The information processing device 10 transmits the normality detection signal (step S21). In this case, the information processing device 10 transmits the normality detection signal to the second terminal device 50 using the second communication scheme.

The second terminal device 50 receives the normality detection signal (step S22). The second terminal device 50 notifies the user of the normality based on the received normality detection signal (step S23). The normality notification to the user is executed, for example, by hiding the button 541 and the button 542 in FIG. 4 and changing the content of the message 551 to "completed" or the like.

In this case, since the user is in the second region R2, the user can perform a remote manipulation while viewing the vehicle. Further, communication between the information processing device 10 and the second terminal device 50 is performed using the second communication scheme such as a BTLE standard. Therefore, a communication speed is not degraded unlike the third communication scheme in which communication is performed via the server 20.

FIGS. 8A and 8B are sequence diagrams illustrating an example of a communication process in a case where the position determination unit 16B determines that the position of the user is included in the third region.

When the information processing device 10 detects an abnormality, the information processing device 10 generates an abnormality detection signal (step S31). Further, the information processing device 10 determines that the user of the vehicle is outside the vehicle cabin (step S32). Steps S31 and S32 correspond to steps S1 and S2 in FIG. 6. Therefore, detailed description will be omitted.

The information processing device 10 transmits the abnormality detection signal (step S33). In this case, the information processing device 10 transmits the abnormality detection signal to the second terminal device 50 via the server 20 using the third communication scheme.

The server 20 transfers the abnormality detection signal received from the information processing device 10 to the second terminal device 50 (step S34). The server 20 can specify the second terminal device 50 that is a transfer destination associated with the information processing device 10 based on the profile data stored in the server storage unit 22.

The second terminal device 50 receives the abnormality detection signal (step S35). In addition, the second terminal device 50 notifies the user of the abnormality (step S36). Further, the second terminal device 50 detects an instruction of the user (step S37). Steps S35, S36, and S37 correspond to steps S14, S15, and S16 in FIG. 7. Therefore, detailed description will be omitted.

The second terminal device 50 transmits a user instruction signal indicating content of the instruction of the user (step S38). In this case, the second terminal device 50 transmits the user instruction signal to the information processing device 10 via the server 20 using the third communication scheme.

The server 20 transfers the user instruction signal received from the second terminal device 50 to the information processing device 10 (step S39).

The information processing device 10 receives the user instruction signal (step S40). Further, the information processing device 10 gives instruction for a manipulation of the vehicle (step S41). Further, the information processing device 10 performs normal detection (step S42). Steps S40, S41, and S42 correspond to steps S18, S19, and S20 in FIG. 7. Therefore, detailed description will be omitted.

The information processing device 10 transmits a normality detection signal (step S43). In this case, the information processing device 10 transmits the normality detection signal to the second terminal device 50 via the server 20 using the third communication scheme.

The server 20 transfers the normality detection signal received from the information processing device 10 to the second terminal device 50 (step S44).

The second terminal device 50 receives the normality detection signal (step S45). In addition, the second terminal device 50 sends a normality notification to the user (step S46). Steps S45 and S46 correspond to steps S22 and S23 in FIG. 7. Therefore, detailed description will be omitted.

In this case, the communication between the information processing device 10 and the second terminal device 50 is performed using the third communication scheme in which communication is performed via the server 20. Therefore, the communication speed decreases. However, the information processing device 10 can notify the user in the third region distant from the vehicle of the abnormality in the state of the vehicle.

Operation Flow of Information Processing Device

FIG. 9 is a flowchart showing an operation (control method) of the information processing device 10 when the communication process is executed.

The controller 16 of the information processing device 10 detects an abnormality based on the vehicle information (step S101). Here, the controller 16 of the information processing device 10 may acquire the vehicle information at predetermined intervals or in response to a predetermined event, and detect the abnormality.

When the user is inside the vehicle (Yes in step S102), the controller 16 of the information processing device 10 ends the process because there is no need to notify the abnormality.

When the user is not inside the vehicle (No in Step S102), the controller 16 of the information processing device 10 proceeds to a process of step S103.

When the controller 16 of the information processing device 10 determines that the position of the user is included in the first region R1 (Yes in step S103), the controller 16 causes the first communication unit 14A to transmit an abnormality detection signal to the first terminal device 40 (step S104). The first communication unit 14A transmits an abnormality detection signal using the first communication scheme.

When the controller 16 of the information processing device 10 determines that the position of the user is not included in the first region R1 (No in step S103), the controller 16 proceeds to a process of step S105.

When the controller 16 of the information processing device 10 determines that the position of the user is included in the second region R2 that is away from the vehicle relative the first region R1 (Yes in step S105), the controller 16 of the information processing device 10 causes the second communication unit 14B to transmit the abnormality detection signal to the second terminal device 50 (step S109). The second communication unit 14B transmits the abnormality detection signal using the second communication scheme.

The controller 16 of the information processing device 10 instructs the ECU to manipulate the vehicle based on the user instruction signal received from the second terminal device 50 (step S110).

When the controller 16 of the information processing device 10 detects that the abnormality of the vehicle has been resolved based on the vehicle information, the controller 16 of the information processing device 10 causes the second communication unit 14B to transmit the normality detection signal to the second terminal device 50 (step S111). The second communication unit 14B transmits the normality detection signal using the second communication scheme.

When the controller 16 of the information processing device 10 determines that the position of the user is included in neither the first region R1 nor the second region R2 (No in step S105), the controller 16 of the information processing device 10 causes the third communication unit 14C to transmit the abnormality detection signal to the second terminal device 50 (step S106). The third communication unit 14C transmits the abnormality detection signal using the third communication scheme.

The controller 16 of the information processing device 10 instructs the ECU to manipulate the vehicle based on the user instruction signal received from the second terminal device 50 (step S107).

When the controller 16 of the information processing device 10 has detected that the abnormality of the vehicle has been resolved based on the vehicle information, the controller 16 of the information processing device 10 causes the third communication unit 14C to transmit the normality detection signal to the second terminal device 50 (step S108). The third communication unit 14C transmits the normality detection signal using the third communication scheme.

Operation Flow of Second Terminal Device

Figure 10:
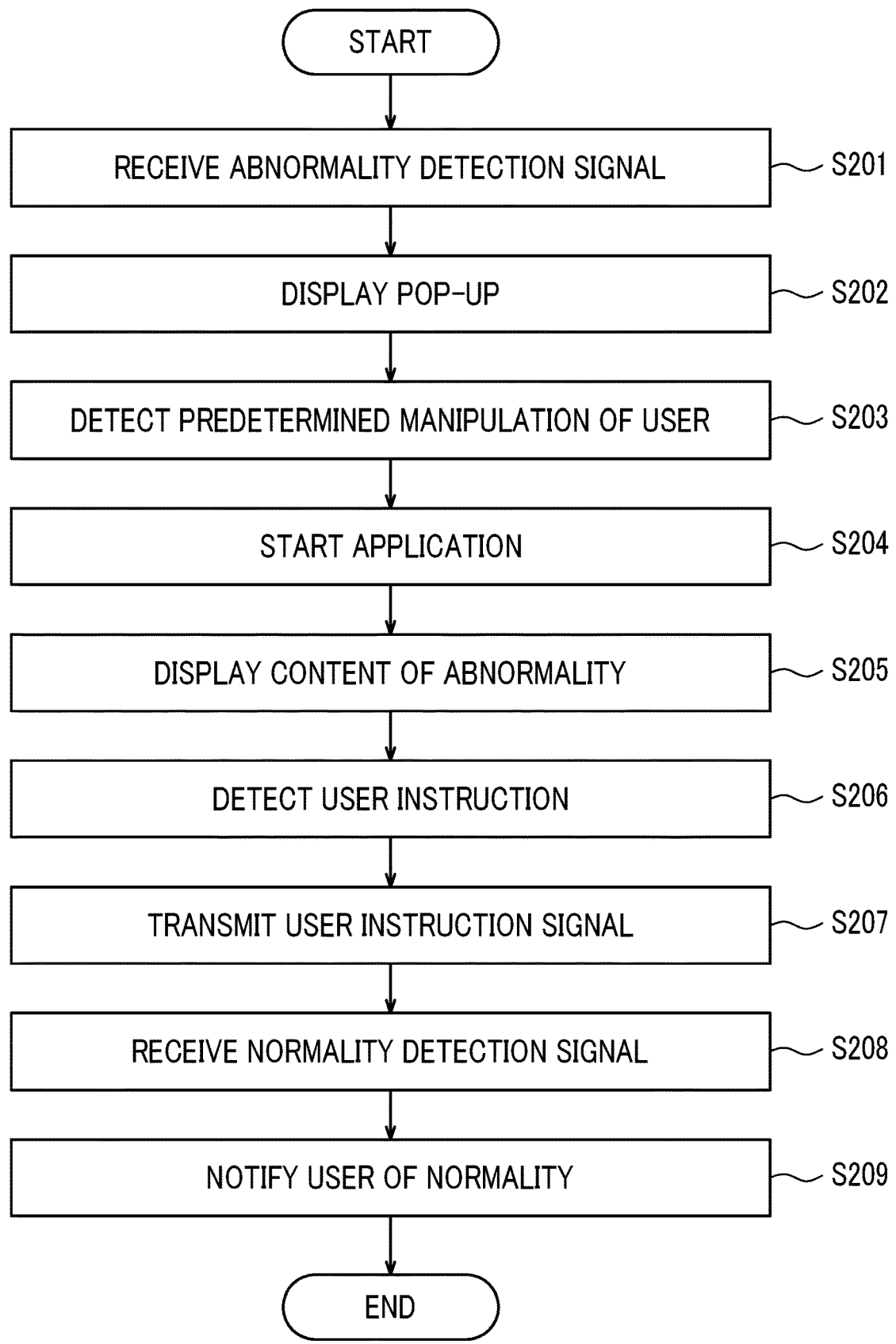
FIG. 10 is a flowchart showing an operation of the second terminal device.

FIG. 10 is a flowchart showing an operation (a control method) of the second terminal device 50 in a case where the communication process is executed.

The second terminal communication unit 51 of the second terminal device 50 receives the abnormality detection signal (step S201).

The second terminal display unit 55 of the second terminal device 50 displays a pop-up screen for warning that there is an abnormality in the vehicle (step S202).

The second terminal input unit 54 of the second terminal device 50 detects a predetermined manipulation of the user (step S203) and notifies the second terminal controller 53 of the manipulation. Here, the second terminal input unit 54, for example, is integrated with the second terminal display unit 55 to constitute a touch panel display. The predetermined manipulation of the user is, for example, a touch of the pop-up screen.

The second terminal controller 53 of the second terminal device 50 starts an application for communication with the information processing device 10 (step S204). That is, the second terminal controller 53 operates the application for communication with the information processing device 10 in a foreground. Here, the application for communication with the information processing device 10 is installed in advance and stored in the second terminal storage unit 52.

The second terminal display unit 55 of the second terminal device 50 displays the content of the abnormality based on the abnormality detection signal (step S205). The content of the abnormality is displayed in the message 551 in an application screen, for example.

The second terminal input unit 54 of the second terminal device 50 detects an instruction of the user (step S206) and notifies the second terminal controller 53 of the instruction. The instruction of the user is performed, for example, by touching the button 541 or the button 542 in the application screen. The second terminal controller 53 generates a user instruction signal indicating the content of the instruction of the user.

The second terminal communication unit 51 of the second terminal device 50 transmits the user instruction signal to the information processing device 10 (step S207).

The second terminal communication unit 51 of the second terminal device 50 receives the normality detection signal (step S208).

The second terminal display unit 55 of the second terminal device 50 notifies the user of the normality based on the received normality detection signal (step S209).

As described above, the information processing device 10 according to the embodiment notifies the first terminal device 40 or the second terminal device 50 of the abnormality in the state of the vehicle according to the determined position of the user. Therefore, there is no annoyance of a double notification. Further, with the information processing device 10 according to the embodiment, when the position of the user is the first region R1 in which the user can immediately return to the vehicle, a notification (for example, vibration) to the user is performed by the first terminal device 40. Further, when the user is further away from the first region R1, the content of the abnormality is displayed on the second terminal device 50. That is, with the information processing device 10 according to the embodiment, an appropriate warning can be made according to the position of the user.

Although the present disclosure has been described with reference to the drawings and examples, it should be noted that those skilled in the art can easily make various modifications and variations based on the present disclosure. Therefore, it should be noted that the modifications and variations are within the scope of the present disclosure. For example, functions or the like included in each means, each step, or the like can be relocated not to be logically contradictory, and a plurality of means, steps, or the like can be combined into one or divided.

For example, in the embodiment described above, the information processing device 10 transmits the abnormality detection signal to the first terminal device 40 or the second terminal device 50 according to the determined position of the user. Here, the information processing device 10 may further select the transmission destination according to the content of the abnormality.

Figure 11:
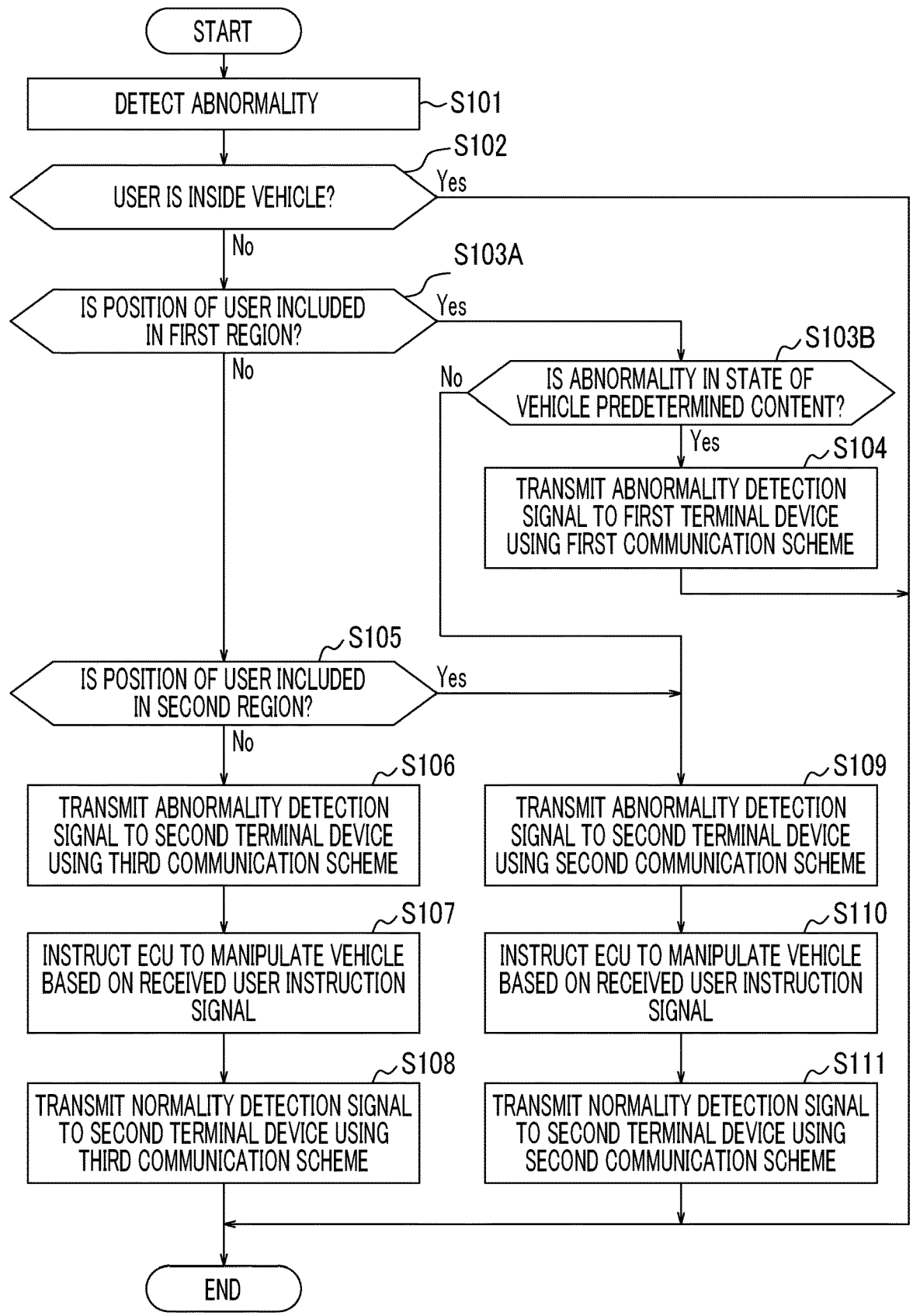
FIG. 11 is a flowchart showing an operation of the information processing device.

FIG. 11 is a flowchart showing an operation of the information processing device 10 in a modification example in which a transmission destination is selected according to the content of abnormality. In the flowchart of FIG. 11, step S103 of the flowchart of FIG. 9 is changed to steps S103A and S103B. Therefore, description of steps other than steps S103A and S103B will be omitted.

In a modification example, when the controller 16 of the information processing device 10 determines that the position of the user is included in the first region R1 (Yes in step S103A), the controller 16 proceeds to a process of step S103B. When the controller 16 of the information processing device 10 determines that the position of the user is not included in the first region R1 (No in step S103A), the controller 16 of the information processing device 10 executes the process of step S105 in which the controller 16 determines whether the user is in the second region R2.

When the abnormality in the state of the vehicle is predetermined content (Yes in step S103B), the controller 16 of the information processing device 10 causes the first communication unit 14A to transmit the abnormality detection signal to the first terminal device 40 (step S104). Here, the predetermined content is content of an abnormality that the user can remotely deal with using the first terminal device 40. For example, when the first terminal device 40 is an electronic key, the predetermined content is that the door is not locked.

When the abnormality in the state of the vehicle is not the predetermined content (No in step S103B), the controller 16 of the information processing device 10 causes the second communication unit 14B to transmit the abnormality detection signal to the second terminal device 50 (step S109). By using the second terminal device 50, the user can remotely deal with abnormalities other than predetermined content.

In the modification example, the information processing device 10 enables the user to deal with the abnormality of the vehicle remotely through the above process. That is, the information processing device 10 according to the modification example enables the user to cope with the abnormality even when the user does not return to the vehicle.

Further, in the above-described embodiment, the user can remotely manipulate the vehicle using the second terminal device 50. Here, the remote manipulation may be executed solely while the user is executing the predetermined manipulation with respect to the second terminal device 50, so that the remote manipulation can be executed more safely. Here, the predetermined manipulation is, for example, that the user touches a manipulation button displayed on the touch panel display. That is, when the user releases a finger or the like from the manipulation button, the remote manipulation may be immediately stopped.

In this case, while the user is executing the predetermined manipulation with respect to the second terminal device 50, the second terminal controller 53 of the second terminal device 50 continues to cause the second terminal communication unit 51 to transmit a user instruction signal. The controller 16 of the information processing device 10 may acquire the user instruction signal via the communication unit 14 and stop giving instruction for the manipulation of the vehicle when the user instruction signal is not acquired.

Further, in the above-described embodiment, the second terminal display unit 55 of the second terminal device 50 also displays the content of the abnormality based on the abnormality detection signal for the user in the third region. Here, the second terminal display unit 55 of the second terminal device 50 may display a message for prompting the user in the third region to return to the second region R2.

Further, in the above-described embodiment, the user in the third region can perform remote manipulation using the second terminal device 50. Here, the remote manipulation using the second terminal device 50 may be executable after the user returns to the second region R2 in which the user can see and confirm the vehicle. In this case, the second terminal display unit 55 of the second terminal device 50 may hide the button 541 or the button 542 for the user in the third region.

Further, in the above-described embodiment, the controller 16 of the information processing device 10 detects an abnormality based on the vehicle information before a determination as to whether or not the user is outside the vehicle cabin. Here, the controller 16 of the information processing device 10 may perform abnormality detection after determining that the user is outside the vehicle cabin.

Further, in the above-described embodiment, the position determination unit 16B determines the position of the user based on the communication state of the first communication unit 14A and the second communication unit 14B. Here, the position determination unit 16B may determine the position of the user based on the communication state of the first communication unit 14A or the second communication unit 14B. For example, the position determination unit 16B may determine that the user is in the first region R1 when an intensity of a received signal of the second communication unit 14B is higher than a first threshold value (for example, 80% of a maximum intensity). Further, for example, when the intensity of the received signal of the second communication unit 14B is lower than a second threshold value (for example, 20% of the maximum intensity), the position determination unit 16B may determine that the user is in the third region. Further, the position determination unit 16B may determine that the user is in the second region R2, for example, when the intensity of the received signal of the second communication unit 14B is lower than the first threshold value and is higher than the second threshold value.

Although the information processing device 10 includes the position determination unit 16B in the above-described embodiment, the information processing device 10 may include a communication state determination unit instead of the position determination unit 16B. That is, the information processing device 10 may switch between the communication schemes based on at least one of the communication states of the first communication unit 14A and the second communication unit 14B without clearly determining the position of the user.

What is claimed is:

1. An information processing device configured to be installed in a vehicle that notifies a user of the vehicle of an abnormality in a state of the vehicle, the information processing device comprising:
a first communication unit configured to communicate with a first terminal device using a first communication scheme;
a second communication unit configured to communicate with a second terminal device using a second communication scheme, the first terminal device and the second terminal device each being portable and each configured to be located separate from the vehicle when the user is not located in the vehicle; and
a controller operatively coupled with the first communication unit and the second communication unit, the controller being configured to:
generate an abnormality detection signal indicating an operating state of the vehicle is in an abnormal state, when an abnormality of the operating state of the vehicle is detected based on acquired vehicle information regarding the vehicle,
determine a position of the user based on a communication state of the first terminal device and a communication state of the second terminal device possessed by the user,
cause the first communication unit to notify the first terminal device by transmitting the abnormality detection signal to the first terminal device when the controller determines that the position of the user is included in a first region, and
cause the second communication unit to notify the second terminal device by transmitting the abnormality detection signal to the second terminal device when the controller determines that the position of the user is included in a second region that is located a distance farther from the vehicle than the first region.

2. The information processing device according to claim 1, further comprising a third communication unit configured to communicate with the second terminal device using a third communication scheme,
wherein the controller is configured to cause the third communication unit to transmit the abnormality detection signal to the second terminal device when the controller determines that the position of the user is included in neither the first region nor the second region.

3. The information processing device according to claim 1, wherein the controller is configured to transmit a control instruction for a manipulation of the vehicle based on a user instruction signal indicating content of a user instruction of the user when the controller acquires the user instruction signal from the second terminal device.

4. The information processing device according to claim 3, wherein the controller is configured to acquire the user instruction signal that is continuously transmitted while the user is executing a predetermined manipulation with respect to the second terminal device and stop transmitting the instruction for the manipulation of the vehicle when the controller does not acquire the user instruction signal.

5. The information processing device according to claim 1, wherein:
the vehicle information is information on opening or closing of a door of the vehicle; and
the controller is configured to generate the abnormality detection signal when the abnormality, which is a driver door of a driver seat of the vehicle is not locked, is detected.

6. A method of controlling a terminal device including a communication unit, a display unit, and an input unit, the communication unit being configured to communicate with an information processing device installed in a vehicle that notifies a user of the vehicle of an abnormality in a state of the vehicle using an abnormality detection signal, the terminal device being portable and configured to be located separate from the vehicle when the user is not located in the vehicle, the method comprising:
receiving, by the communication unit, the abnormality detection signal when the information processing device determines that a position of the user is included in a second region that is a distance farther from the vehicle than a first region based on a communication state of the terminal device possessed by the user, the abnormality detection signal indicating an operating state of the vehicle is in an abnormal state;
displaying, by the display unit, content of the abnormality based on the abnormality detection signal to notify the user of the abnormality;
detecting, by the input unit, an instruction of the user for the abnormality; and
transmitting, by the communication unit, a user instruction signal indicating content of the instruction of the user to the information processing device.

7. A non-transitory computer-readable recording medium storing a program causing a terminal device including a communication unit, a display unit, and an input unit to execute a process, the communication unit being configured to communicate with an information processing device installed in a vehicle that notifies a user of the vehicle of an abnormality in a state of the vehicle using an abnormality detection signal, the terminal device being portable and configured to be located separate from the vehicle when the user is not located in the vehicle, the process comprising:
receiving, by the communication unit, the abnormality detection signal when the information processing device determines that a position of the user is included in a second region that is a distance farther from the vehicle than a first region based on a communication state of the terminal device possessed by the user, the abnormality detection signal indicating an operating state of the vehicle is in an abnormal state;
displaying, by the display unit, content of the abnormality based on the abnormality detection signal to notify the user of the abnormality;
detecting, by the input unit, an instruction of the user for the abnormality; and
transmitting, by the communication unit, a user instruction signal indicating content of the instruction of the user to the information processing device.

8. An information processing device configured to be installed in a vehicle that notifies a user of the vehicle of an abnormality in a state of the vehicle, the information processing device comprising:

a first communication unit configured to communicate with a first terminal device using a first communication scheme;

a second communication unit configured to communicate with a second terminal device using a second communication scheme, the first terminal device and the second terminal device each being portable and each configured to be located separate from the vehicle when the user is not located in the vehicle; and a controller operatively coupled with the first communication unit and the second communication unit, the controller being configured to:

generate an abnormality detection signal indicating an operating state of the vehicle is in an abnormal state, when an abnormality of the operating state of the vehicle is detected based on acquired vehicle information regarding the vehicle, determine a position of the user based on a communication state of the first terminal device and a communication state of the second terminal device possessed by the user, cause the first communication unit to notify the first terminal device by transmitting the abnormality detection signal to the first terminal device when the controller determines that the position of the user is included in a first region and the abnormality is a predetermined content, and cause the second communication unit to notify the second terminal device by transmitting the abnormality detection signal to the second terminal device when the controller determines that the position of the user is included in the first region and the abnormality is not the predetermined content.

* * * * *